United States Patent
Neiger

(12) 
(10) Patent No.: US 6,377,582 B1
(45) Date of Patent: Apr. 23, 2002

(54) DECENTRALIZED RING ARBITRATION FOR MULTIPROCESSOR COMPUTER SYSTEMS

(75) Inventor: Gilbert A. Neiger, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/130,377

(22) Filed: Aug. 6, 1998

(51) Int. Cl.$^7$ .................................................. H04J 3/00
(52) U.S. Cl. ....................................... 370/406; 370/412
(58) Field of Search ................................ 370/389, 406, 370/412, 429

(56) References Cited

U.S. PATENT DOCUMENTS

| | | | |
|---|---|---|---|
| 4,933,933 A | * 6/1990 | Dally et al. | .................... 370/60 |
| 5,025,365 A | 6/1991 | Mathur et al. | |
| 5,604,450 A | 2/1997 | Borkar et al. | |
| 5,623,628 A | 4/1997 | Brayton et al. | |
| 5,715,428 A | 2/1998 | Wang et al. | |
| 5,751,986 A | 5/1998 | Fetterman et al. | |
| 5,881,303 A | 3/1999 | Hagersten et al. | |
| 5,960,179 A | 9/1999 | Hagersten | |
| 6,112,283 A | * 8/2000 | Neiger et al. | ................ 711/146 |

OTHER PUBLICATIONS

Barroso, Luiz A. and Michael Dubois, "Cache Coherence on a Slotted Ring", Proceedings of the 1991 International Conference on Parallel Processing, Aug. 1991, pp. I–230 to I–237.

Hopper, Andrew and Roger M. Needham, "The Cambridge Fast Ring Networking System", IEEE Transactions on Computers, vol. 37, No. 10, Oct. 1988, pp. 1214–1223.

Neiger, Gil and Sam Toueg, "Simulating Synchronized Clocks and Common Knowledge in Distributed Systems", Journal of the Association for Computing Machinery, vol. 40, No. 3, Apr. 1993, pp. 334–367.

Pierce, John R. "How Far Can Data Loops Go", IEEE Transactions on Communications, vol. Com–20, No. 3, Jun. 1972, pp. 527–530.

* cited by examiner

Primary Examiner—Melvin Marcelo
(74) Attorney, Agent, or Firm—Alan K. Aldous

(57) ABSTRACT

In some embodiments, a ring based multiprocessor system includes nodes in a ring, at least some of the nodes including network interface circuitry to transmit messages beginning at a first flit of multi-flit virtual slots. In some embodiments, a ring based multiprocessor system includes nodes in a ring at least some of the nodes including network interface circuitry to transmit messages in virtual slots between nodes. The interface circuitry includes control circuitry to determine whether to retain or release ownership of the virtual slots based on values in an insig buffer and an ownership history table.

24 Claims, 3 Drawing Sheets

DECENTRALIZED RING ARBITRATION FOR MULTIPROCESSOR COMPUTER SYSTEMS

RELATED APPLICATIONS

The present application and application Ser. No. 09/130,302, now U.S. Pat. No. 6,112,283, entitled "Out-of-Order Snooping For Multiprocessor Computer Systems" and appl. Ser. No. 09/130,399, entitled "Passive Message Ordering On A Decentralized Ring" pending, each filed concurrently herewith, have overlapping specifications, but claim different subject matter.

BACKGROUND OF THE INVENTION

1. Technical Field of the Invention

The present invention relates to the use of virtual slots in a ring topology and to a dynamic wait method of determining whether a node in the ring should retain or give up ownership of a virtual slot.

2. Background Art

Multiprocessor computer systems have included buses that allow communication between processors, and between a chipset and the processors (each of which are referred to as nodes). To avoid contention on the bus, a central arbiter, which may be in the chipset, determines which node on the bus may transmit a message on the bus. A message on the bus is broadcast to each node on the bus and each node receives the message essentially at the same time. Therefore, there is no confusion as to the order in which the messages are transmitted.

Ring topologies have been developed in which each node is connected to an adjacent node on a ring. In a point-to-point ring, each node is separated from adjacent nodes on the ring by links (conductors). An advantage of rings are that the drivers of conductors on the ring are loaded only with the receiver circuitry of the particular node, not all nodes on the system. Accordingly, the signals may change state significantly faster.

Each node may transmit messages to each other node, but the messages are passed sequentially from node to node, rather than from a central point to all nodes simultaneously. Accordingly, none of the links can be observed by all the nodes. Control of access to the ring is nontrival.

There is a need for an improved system and method for transmitting messages on the ring and for determining which nodes may transmit the messages at a given time.

SUMMARY OF THE INVENTION

In some embodiments, a ring based multiprocessor system includes nodes in a ring, at least some of the nodes including network interface circuitry to transmit messages beginning at a first flit of multi-flit virtual slots.

In some embodiments, a ring based multiprocessor system includes nodes in a ring at least some of the nodes including network interface circuitry to transmit messages in virtual slots between nodes. The interface circuitry includes control circuitry to determine whether to retain or release ownership of the virtual slots based on values in an insig buffer and an ownership history table.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION OF PREFERRED EMBODIMENTS

1. Overview

Figure 1:
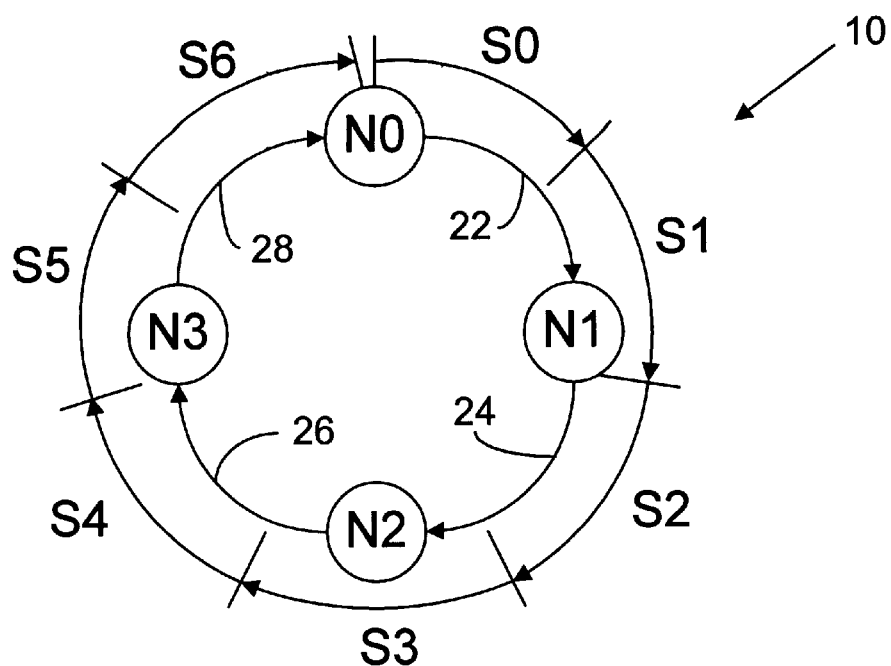
FIG. 1 is a schematic representation of actual distribution of request slots in an exemplary embodiment of the invention.

Referring to FIG. 1, an exemplary computer system 10 includes nodes N0, N1, N2, and N3. The nodes communicate with each other through a point-to-point ring topology rather than a shared bus. Signals may be passed between nodes N0 and N1 on conductors 22; between nodes N1 and N2 on conductors 24; between node N2 and N3 and conductors 26; and between nodes N3 and N4 on conductors 28. Conductors 22–28 may each include numerous parallel conductors. Different ones of conductors 22 are used for different purposes, different ones of conductors 24 are used for different purposes, different ones of conductors 26 are used for different purposes, and different ones of conductors 28 are used for different purposes. For example, virtual slots, described below, may be transmitted on only some of the conductors of conductors 22–28. Snoop responses may be transmitted on different conductors than snoop requests. In some embodiments, some signals, such as data signals, are sent on conductors not included in conductors 22–28. FIG. 1 illustrates a unidirectional example in which signals travel only in the clockwise direction. In the example, the nodes do not share a global clock, and use source-synchronous transmission.

Figure 3:
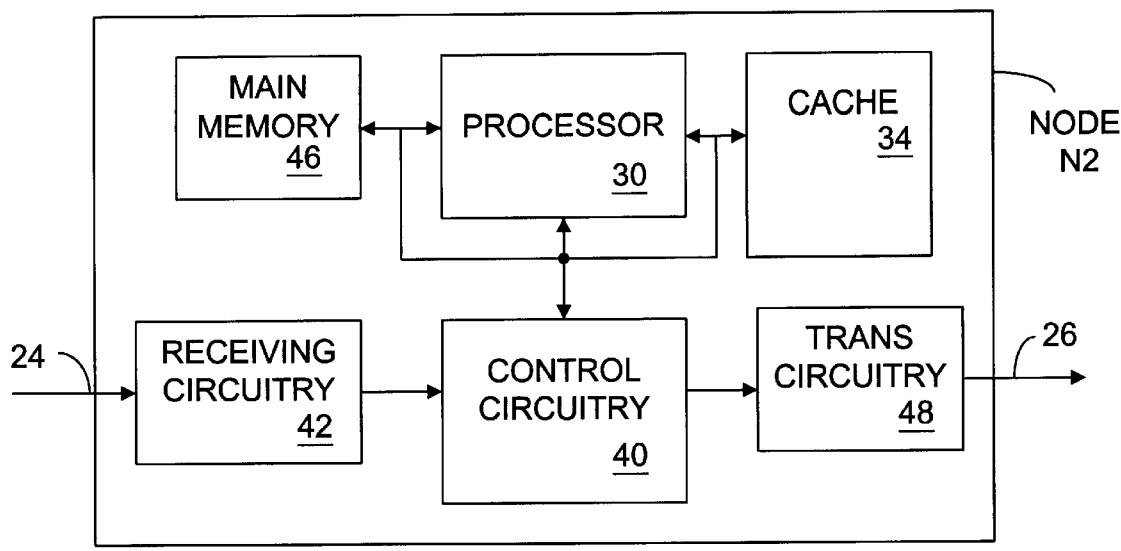
FIG. 3 is a schematic representation of certain circuitry in one of the nodes of FIGS. 1 and 2 in an exemplary embodiment of the invention.

FIG. 3 illustrates an exemplary embodiment of node N2, which includes a processor 30 and a cache 34 (which may be on the same die as processor 30). Node N2 may include more than one processor and/or a chipset to memory and/or peripherals. Processor 30 interfaces with network interface circuitry, which in some embodiments includes receiving circuitry 42, control circuitry 40, and transmitting circuitry 48. Cache 34 may be accessible both through a backside bus to processor 30 and directly to control circuitry 40 as illustrated, or through only one or the other. Main memory 46 is optional and may be part of a shared main memory with other nodes. It may be directly accessible by the processor and/or control circuitry 40. FIG. 3 illustrates receiving circuitry 42 and transmitting circuitry 48 as being separated by control circuitry 40, however, the signals may be rapidly moved from receiving to transmitting circuitry, and in some embodiments, the same circuitry may be used for both. Node N2 may include components not illustrated in FIG. 3. A node may be part of more than one ring. Functions of control circuitry 40 described herein may be performed by processor 30. Nodes N0, N1, and N3 may be the same as or different than N2. Merely as an example, conductors 22–28 each may be on the order of a few centimeters or less in length. As another example, system 10 may be a distributed network where conductors 22–28 are, for example, several meters in length.

Consider the following example in which a processor in node N0 wants to determine whether a cache or other memory associated with processors in nodes N1, N2, or N3 has a particular cache line. A request message (which may be in the form of a packet) is sent on conductors 22 to node N1 requesting whether node N1 has the cache line. Before node N1 determines whether it has the cache line, the message is passed on conductors 24 to node N2 requesting whether node N2 has the cache line. Before node N2 determines whether it has the cache line, the message is passed on conductors 26 to node N3 requesting whether node N3 has the cache line. The message is passed on conductors 28 back to node N0. In the example, the message transmitted by nodes N0–N4, but only originally transmitted by node N0.

System 10 is decentralized in that there is no central arbitrator. In some embodiments, system 10 will mimic a centralized bus-based system so that conventional protocols (such as cache coherence) can be used with little or no change. In many, if not all, bus-based systems, only one agent may insert data onto the bus at a time and all agents see messages on the bus simultaneously and in the same order. A ring comprises multiple communications links, none of which can be observed by all agents. Some embodiments of the invention involve a decentralized ring-arbitration method by which agents may quickly gain access to the ring without interfering with each other and which provides high utilization. The technique involves the concept of virtual slots, described below.

2. Virtual Slots

In some embodiments, a virtual slot is the unit of ring bandwidth that is sufficient to transport the largest packet or other form of message transmitted in that part of the ring. If such a packet is larger than the number of conductors of the ring available for transmitting messages, it may take more than one clock cycle for an agent to send a packet. The length of a virtual slot is the largest number of cycles used in the relevant conductors of the ring.

The following is an example for system 10, which has 4 nodes. Of course, the invention may be implemented with a greater or lesser number of nodes and with different details. Assume the total delay between a pair of nodes (flight time plus node delay) is 9 clock cycles. Accordingly, it takes 36 clock cycles for a single flit (not a full message packet) to traverse the ring. In a sense, the ring can hold 36 separate flits. Further suppose that it takes 5 clock cycles for a node to send a message packet. Accordingly, the entire ring can hold up to $\lfloor 36/5 \rfloor = 7$ messages at any time. The 36 flits that are traversing the ring are considered as composing 7 virtual slots and 1 unused flit. In the example, the ring capacity is 7 virtual slots.

Figure 2:
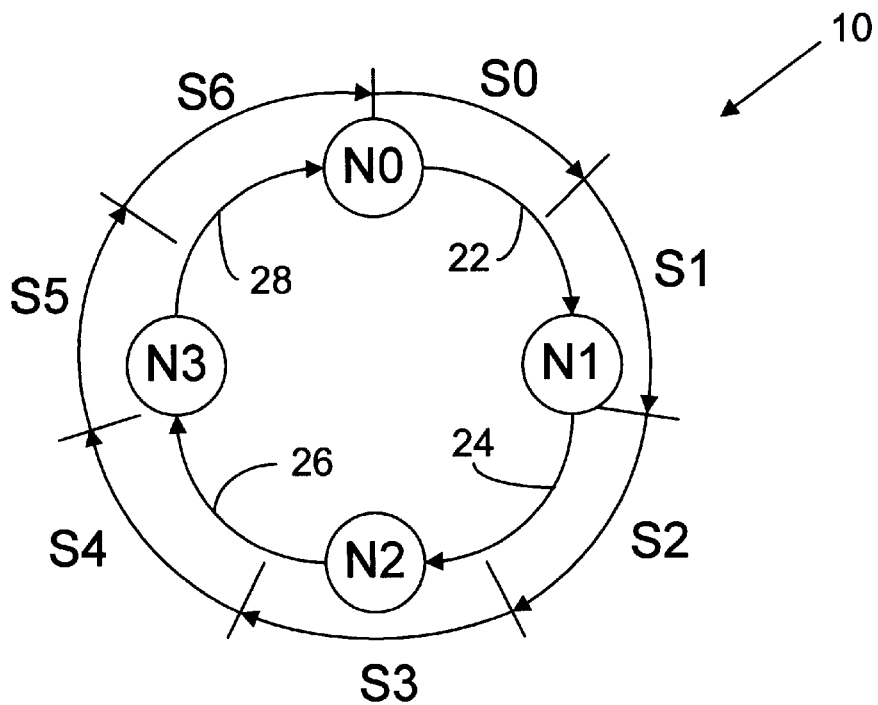
FIG. 2 is a schematic representation of virtual distribution of request slots in an exemplary embodiment of the invention.

The 7 virtual slots (S0, S1, S2, S3, S4, S5, and S6) can be visualized as shown in FIGS. 1 and 2. The 1 unused cycle or flit is shown in FIG. 1, but not FIG. 2. FIG. 1 illustrates an actual distribution of message slots and FIG. 2 illustrates a virtual distribution of message slots.

Nodes might not know precisely the various timings used in computing the number of virtual slots in a ring. However, the nodes may know the number c of clocks that it takes to emit a message (c=5 in the example above). Using this, nodes may compute the number of virtual slots in the ring. As an example, consider the following procedure. At system start-up, a distinguished node (e.g., N0) begins emitting flits, which the nodes then cycle around the ring. Each one of these is tagged with an increasing sequence number. Suppose that the node has emitted p flits at the time when the flit labeled 0 returns to it. The node knows that the ring can contain p flits and the number of virtual slots is then $s=\lfloor p/c \rfloor$. This can be communicated to the other nodes.

In some embodiments, once the number of virtual slots has been determined, the distinguished node marks the first (header) message of each virtual slot. A node begins inserting a packet only into a vacant message that is the header of a virtual slot. The distinguished node can put a slot ID on the first flit of each virtual slot, identifying it. The nodes can then look for flits with these slot IDs to determine which flits they can use for their messages. A node will put the first flit of a message only in a vacant flit that is the beginning of a virtual slot.

The number of virtual slots in a ring may change over time (e.g., under changing thermal conditions). The system can be designed either so that it uses fewer virtual slots than are available (allowing for an increase) or so that it periodically reconfigures itself to add or relinquishing slots.

3. Decentralized Ring Arbitration

This section describes a method by which agents on the ring can arbitrate (or compete) for access to the ring's communication capacity. The method is decentralized in the sense that the agents coordinate for access using the ring itself rather than some alternative centralized communication network. One advantage of this decentralization is that it does not need global clock synchronization that are typically used in centralized networks. The method is based on the virtual-slot abstraction.

In general, a node with a packet to send waits until an empty virtual slot comes to it. Depending on the details of the arbitration method, the node may choose to place the packet in the slot. Some cache-coherence protocols involve a request packet being broadcast (as on a bus) to all caching and memory agents. To satisfy these protocols, the request packet may make a circuit of the ring within its virtual slot. It eventually returns to the sending node, which removes the packet from the slot.

In some embodiments, the first flit of every virtual slot carries a field that identifies the node that "owns" the slot. A node may insert a request into only those nodes that it owns. Moreover, it retains ownership of the slot while its request is in the slot. When a request returns to the owning node, the node may put another request in the slot (as it still owns the slot) or it may transfer ownership of the slot to another node. If ownership of a slot is transferred, it may be usually to the next node. However, specifics of when a node may reuse an owned slot and how ownership of slots is transferred depend on the method being used. Under one method, a node always reuses its own slots if it has more requests. This leads to high utilization of the ring, but may result in a particular node or nodes being starved, resulting in unacceptably high latencies. Under another method, a node never reuses its own slots. Rather, after removing a returning packet, the node passes the slot to the next node needing a slot. While this method will prevent starvation, it significantly reduces utilization. Wasted communication capacity may be inversely proportional to the number of nodes in the ring. For example, if there are 4 nodes, 25% of capacity may be wasted.

To limit maximum latency, a node should sometimes decline to use an empty slot, even if it has a packet to send. The present invention involves a method, called a dynamic-wait method, and system for implementing the method. Under the dynamic-wait method, whether ownership is transferred is dependent on the state of certain signals stored in the nodes and signals (e.g., header or side-band signals) passed between nodes.

3.1. Dynamic-Wait Method: Overview

In some embodiments, the header or other sideband signal of every virtual slot carries a field that identifies the node that "owns" the slot. A buffer in control circuitry 40, referred to as "insig" buffer (short for "in signal"), holds bits of an insig signal that represent whether a particular node wants to obtain or retain ownership of a slot and which node owns the slot. A buffer referred to as "outsig" buffer (short for "out signal") holds bits of an outsig signal that indicate the same information after the dynamic-wait method has been implemented for the particular received slot. The bits of the insig signal are received with the message in the slot. The bits of the outsig signal are sent with the message in the slot to the next node. As illustrated, there are separate insig and outsig buffers. Alternatively, the may be insig and outsig signals in the same buffer at different times. An advantage of having separate insig and outsig buffers is that the insig buffers can receive signals while the outsig buffers are sending signals.

Figure 4:
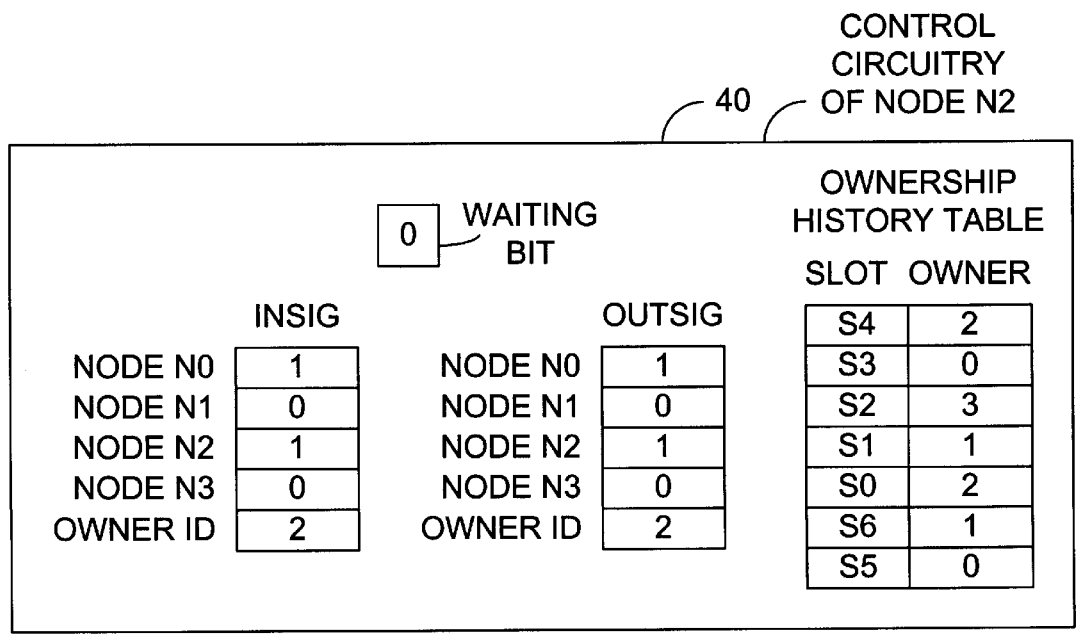
FIG. 4 is a schematic representation of details of the control circuitry of FIG. 3 in an exemplary embodiment of the invention.

In the example of FIG. 4, nodes N0 and N2 are waiting for a slot so the corresponding bits in insig buffer are set to 1. Nodes N1 and N3 are not waiting for a slot so the corresponding bits in insig buffer are set to 0. Node N2 is the owner of the currently received slot and a "2" is placed in the corresponding location of the insig buffer.

Control circuitry 40 also includes a waiting bit that is, for example, set to 1 if node N0 is waiting for a slot and set to 0 if node N1 is not waiting for a slot. Control circuitry 40 includes an ownership history table that includes, for example, fields to indicate which node has owned each slot for the last N slots. In the example, there are seven slots and N is 7. In one implementation, there are two fields for each slot: the slot number and the slot owner (as is illustrated in FIG. 4). In another implementation, the slot is implicit based knowledge of where the current slot is in the ownership history table. In some embodiments, the ownership history table is a first in first out (FIFO) buffer (queue) where the most recently received slot (the current slot) is in one end and the oldest slot is at the other. As each new slot moves through the node, it is added to one end and each slot is pushed down the buffer with oldest slot being pushed off the other end. In FIG. 4, slot S4 is the current slot, and S5 is the oldest slot. The next slot to be received will be slot S5 and S6 then will be the oldest slot. Other implementations may be used.

A node may transfer ownership of a slot it owns even when it has a packet to send. The node will do so only if it has reason to believe that there is some other node that is waiting for an empty slot. In such a case, the owning node will transfer ownership of the slot to another node that the owning node believes to be waiting for a slot.

In some embodiments, additional infrastructure is used to communicate information about whether nodes are waiting. For example, a side-band signal may be used on a link (e.g., conductors 22, 24, 26, and 28) for every node in the system (these signals may essentially compose an additional field in each slot header). Thus, in these embodiments, in a 4-node system, each link would have 4 side-band signals for that purpose. It may have other sideband signals for other purposes.

Some embodiments of the dynamic wait method may be informally described as follows. Each signal corresponds to a node in the system. When a node needs to send a message but cannot do so because it cannot acquire an empty slot, it raises the signal that corresponds to itself. When a node learns that some upstream node is waiting for a slot, it also raises the signal that corresponds to the waiting node. A node will decline to "forward" such a signal under a variety of circumstances that are discussed in more detail below. Generally, the signal will cease to propagate once some node has sent a virtual slot to the waiting node. This will keep too much bandwidth from being set aside for a single waiting node.

Implementation details of certain embodiments are presented in paragraphs in section 3.2 and pseudocode in section 3.3. However, the invention is not restricted to the particular details.

3.2 Implementation Details

The implementation details of some embodiments of the invention are given in the following paragraphs. Each node maintains the following information locally:

- a waiting bit (initially clear) that indicates whether or not it is waiting for a virtual slot;
- a FIFO queue (initially empty) (for example, the ownership history buffer) that keeps track of the other nodes to which it has forwarded slots in the recent past (the size of this queue is implementation dependent, but it is sufficient for it to have as many entries as there can be slots in the ring).

The following paragraphs describe the control of the method. Consider the following cases for when a virtual slot comes to a node:

- The slot is owned by another node. In this case, the slot's flits are forwarded around the ring without change. This slot may contain a request, which is processed by the node. However, it may be that the slot is empty and has been reserved for the other node by a previous sender. In any case, the node records the fact that it recently sent a slot to the owning node.
- The slot is owned by the node itself and node has a request to send. The node will use the slot, retaining ownership, if its waiting bit is set or if none of the side-band signals corresponding to other nodes are currently raised. Otherwise, it will decline to use the slot. In this case, at least one of the side-band signals corresponding to other nodes is currently raised. Ownership of the slot is transferred to the closest of the waiting nodes. By "closest", it is meant the first node that will receive the slot as it is passed around the ring. This node may not be the next to receive the slot; even so, the slot is "reserved" for that node.
- The slot is owned by the node but the node has no request to send. In this case, ownership is transferred to the downstream neighbor, to whom the slot is passed, empty. The node records the fact that it recently sent a slot to the downstream neighbor. (Note that it is not necessary, in the case, to mark the slot as being for some waiting node. This is because the side-band signals travel with the slot. Either the slot will reach a waiting node, who will use it, or it will be reserved for the waiting node by some intervening node that does have requests to send.)

The method also involves how the side-band signals and the waiting bits are controlled:

- Ones own signal. A node begins each cycle by raising its own side-band signal if and only if its own incoming signal is raised. After this, it raises its own outgoing signal if the following conditions all hold: (1) it is processing the first flit of a virtual slot, (2) it has a request to send, (3) it cannot place its request in slot (see above), (4) its waiting bit is clear, and (5) it has no outstanding requests on the ring. If these conditions are all true, it also sets its waiting bit. It lowers its own outgoing signal (and clears its waiting bit) in any cycle in which it actually sends a request or in which it has no requests to transmit.

Signals corresponding to other nodes. At the beginning of each cycle, a node raises a signal corresponding to another node n only if the incoming signal corresponding to n was raised and this node has not passed an empty virtual slot to n since the time that n originally raised its own signal. (The current node can estimate this because it knows how many slots fit in the ring and, therefore, about how many slots it has sent since n raised its signal. Precision is not necessary here as this is only a tuning parameter.) The node lowers the signal corresponding to n (if this signal was raised to it at the beginning of the cycle) when it reserves a slot for n (see above).

3.3 Pseudocode

The following is pseudocode that describes the processing of some embodiments of the dynamic-wait method:

invention may be somewhat different than the particular details described in the pseudo code.

Virtual slot V is the slot that is being received by node N. Node N may or may not own virtual slot V. M represents each of the nodes (e.g., N0, N1, N2, and N3). Insig[M] are the bits of the signals of the insig buffer for each of the nodes and outsig[M] are the bits of the signals of the outsig buffer for each of the nodes.

The "foreach" section states for node N, the contents of the insig[N] is transferred to outsig[N]. For example, if the node under consideration is node N2, then insig[N2] would be transferred to outsig[N2]. Note that signals in the outsig buffer may be modified prior to being sent to the next node. It is determined whether insig[M]=1 (meaning separately insig[N0]=1, insig[N1]=1, and insig[N3]=1) and whether M (meaning separately for N0, N1, and N3) did not own any of the last sub(N, M) slots sent by N. (Note that for sub(N,M), N0 may have the value 0, N1, may have the value 1, N2 may have the value 2, and N3 may have the value 3). Sub(N,M) computes the distance between nodes. The outsig bit is provided as stated in the pseudo code.

The "if N has packet to send" section, specifies various conditions and resulting events. Under the first "if N owns V" section either waiting=1 or insig[M]=0 for the other nodes. If the waiting bit was set, node N has waited and deserves a slot. If the other insig[M] are 0, they do not need a slot, so node N will take it. In either case, because node N

```
Initialization:
each virtual slot is owned by the next node to receive it
each virtual slot has all associated side-band signals lowered
all waiting bits are clear
Upon receipt of a virtual slot V by node N:
let waiting be N's waiting bit
    insig[M] be incoming side-band signal corresponding to node M
    outsig[M] be outgoing side-band signal corresponding to node M
    sub(N,M) be (N + S − M) mod S, where S is the size of the ring (in nodes)
foreach node M do
    if M=N then
        outsig[N]=insig[N]
    else if insig[M]=1 and M did not own any of the last sub(N,M) slots sent by N then
        outsig[M]=1
    else
        outsig[M]=0
if N has a request(s) to send then
    if N owns V and (waiting=1 or insig[M]=0 for all M≠N) then
        send request in slot
        waiting=0
        outsig[N]=0
    else if N owns V and (waiting = 0 and insig[M] = 1 for some M≠N) then
        let M = nearest node (in the downstream direction) with insig[M]=1
        set owner of V to M
        outsig[M]=0
    else if N's waiting=0 and N has no requests traveling the ring then
        outsig[N]=1
        waiting=1
else
    outsig[N]=0
    if N owns V then
        set owner of V to (N+1) mod S.
```

The functions of the pseudo code may be implemented in hardware, firmware, or software in the control circuitry or processor. The dynamic wait method uses the functions of the pseudocode to determine whether to release ownership of a slot and provide the slot to another node. The functions of the pseudo code are used in determining the state of the bits of the outsig buffer as functions of the states of the insig bits, the wait bit, and the states of the bits of the ownership history table. A dynamic wait method within the scope of the has just used a slot, it will set waiting to 0. In the following "else if" section, N owns V, but waiting=0 and another insig[M]=1. Ownership of the slot is transferred and the corresponding outsig is set to 0 because it received a slot. If the next "else if" section if N has no packets traveling, but has packets to send both the outsig[N] bit and the waiting bit are set to 1. One way to determine whether N has packets traveling in the ring is to look at the ownership history table.

Referring to FIG. 4, the insig signal received on conductors 24 included that nodes N0 and N2 were waiting for a slot and nodes N1 and N3 were not. Since node N2 is waiting for a slot, node N0 determines whether to give up ownership of a slot it may own. If node N0 gives up ownership of the slot, it would change the state of the insig[N3] bit from a 1 to a 0.

As used herein, a bit is "asserted" when it has a certain state, which could be a logic one, a logic zero, VDD/2, or some other value or range of values, depending on the implementation. A bit is "deasserted" when it has a different state. For example, a bit may be asserted with a logic one and deasserted with a logic 0. One bit could be asserted with one value (e.g., logic zero) while another bit could be asserted with a different value (e.g., a logic one).

4. Bi-directional

Types of bi-directional signally on the ring include (1) using different conductors for different directions and (2) using the same conductor for both directions. See, for example, U.S. Pat. No. 5,604,450 to Borkar et al. Under one technique for using the same conductor, both nodes know they other node sent a logic high signal if the conductor remains high and both nodes know the other node sent a logic low signal if the conductor remains low. Each node knows the other node sent a signal with a different state if they conductor changes to a different voltage (e.g., ½ VDD), where VDD is high. The receiving node may change its receiver circuits from VDD/2 to VDD/4. Other schemes may be used for bi-directional signaling. Details of bi-directional signaling and selection of directions can be chosen to enhance speed of delivery and balance performance.

Figure 5:
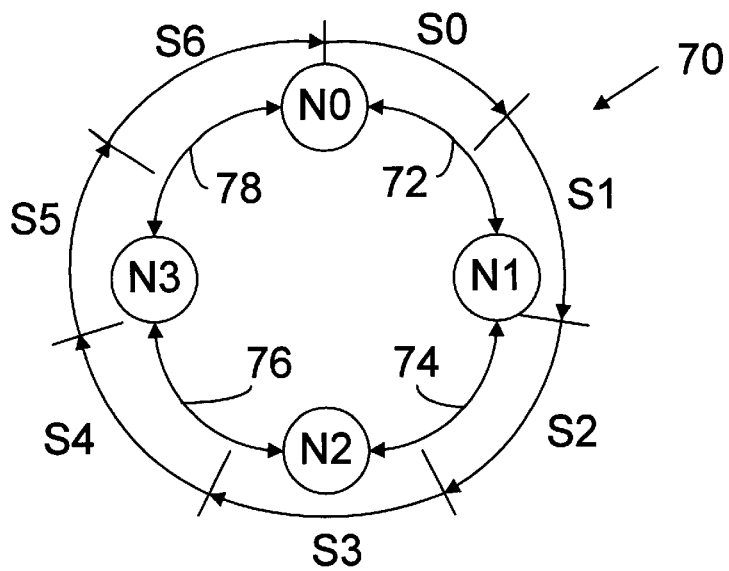
FIG. 5 is a schematic representation of virtual distribution of request slots in an exemplary embodiment of the invention including simultaneous bi-directional transmission between nodes.
Figure 6:
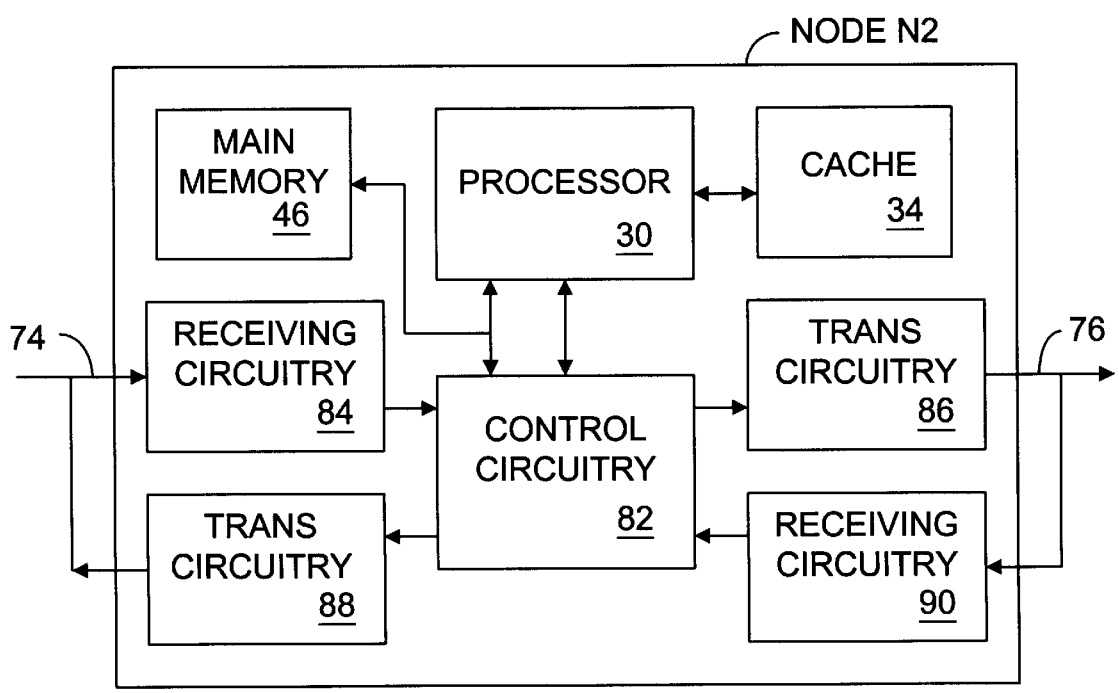
FIG. 6 a schematic representation of certain circuitry in one of the nodes of FIG. 5 in an exemplary embodiment of the invention.

FIG. 5 illustrates a bi-directional ring 70 in which nodes N0 and N1 are bi-directionally connected through conductors 72, nodes N1 and N2 are bi-directionally connected through conductors 74, nodes N2 and N3 are bi-directionally connected through conductors 76, nodes N3 and N0 are bi-directionally connected through conductors 78. There may be some messages that only pass in one direction (e.g., snoops for odd number cache lines) and other messages that only pass in the other direction (e.g., snoops to even number cache lines). Referring to FIG. 6, receiving circuitry 84 and 90 receive signals in different directions, while transmitting circuitry 86 and 88 transmit signals in different directions. Control circuitry 82 may be similar to control circuitry 40 but handle signals in both directions. There may be insig and outsig buffers, waiting bits, and ownership history tables for each direction. The bi-directional scheme can be thought of and treated as two independent unidirectional schemes.

In some embodiments, although address requests are broadcast to each node on the ring, there can be an advantage to choosing one direction over another. Performance will be enhanced if the node that holds the memory being requested gets the request as quickly as possible. For that reason, requests can be sent (in a bi-directional ring) in the direction that minimizes delivery time to that other node. If the node is equidistant in both directions, then directions can be assigned to balance the address traffic.

The virtual-slot layer and arbitration layer can be maintained independently for the two directions. This way, congestion in one direction will not disrupt ring traffic in the other direction. In some embodiments, when memory consistency requires it, however, nodes may continue to issue their requests in order. Suppose, for example, that a node's first request should be sent clockwise 5 and its second counterclockwise. If the clockwise ring is congested and the counterclockwise is not, the node will not (if ordering is required) attempt to issue the counterclockwise request until the clockwise request is put on the ring. Techniques beyond the scope of the present invention may be used to maintain correct ordering of snoops.

5. Additional Information and Embodiments

There may be intermediate structure (such as a buffer) or signals between two illustrated structures or within a structure (such as a conductor) that is illustrated as being continuous. The borders of the boxes in the figures are for illustrative purposes and not intended to be restrictive. Arrows show certain signal flow in certain embodiments, but not every signal, such as control signals and requests for data.

In some embodiments, a ring includes only two nodes wherein signals are passed bi-directionally between the nodes (e.g., simultaneously on at least one conductor and/or unidirectionally on more than one conductor).

The invention is not limited to conductors that conduct voltage signals. For example, the conductors may be fiber optic conductors. Two or more of the nodes in a ring may be wirelessly connected through electromagnetic signals.

If the specification states a component, feature, structure, or characteristic "may", "might", or "could" be included, that particular component, feature, structure, or characteristic is not required to be included. Reference in the specification to "some embodiments" means that a particular feature, structure, or characteristic described in connection with the embodiments is included in at least some embodiments, but not necessarily all embodiments, of the invention. The various appearances "some embodiments" are not necessarily all referring to the same embodiments.

As used herein, a bit is "asserted" when it has a certain voltage state or is within a range associated with being asserted and "deasserted" when it has some different state or is within another range associated with being deasserted. An asserted or deasserted bit could be a logic one, a logic zero, VDD/2, or some other value or range of values, depending on the implementation.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A ring based multiprocessor system, comprising:
   nodes in a ring, at least some of the nodes including network interface circuitry to transmit messages beginning at a first flit of multi-flit virtual slots, wherein the network interface circuitry includes control circuitry including an insig buffer to receive in signals from a previous node, an outsig buffer to hold out signals for transmission to a next node, and an ownership history table.

2. The system of claim 1, wherein a node will only provide a message in a virtual slot if the node owns the virtual slot.

3. The system of claim 1, wherein arbitration is through analyzing signals associated with the messages rather than through a central arbiter.

4. The system of claim 1, wherein the control circuitry further includes a waiting bit.

5. The system of claim 4, wherein the control circuitry determines whether to retain or release ownership of a virtual slot based on values in the insig buffer, the waiting bit, and ownership history table.

6. The system of claim 5, wherein the node associated with a particular one of the control circuitry is referred to as the reference node, and wherein if the reference node has a request to send and it owns the virtual slot, and either its waiting bit is set or no other nodes want the virtual slot, the reference node will send the request in the virtual slot, deassert its waiting bit, and deassert a value in the outsig corresponding to the reference node.

7. The system of claim 5, wherein the node associated with a particular one of the control circuitry is referred to as the reference node, and wherein if the reference node has a request to send and it owns the virtual slot, its waiting bit is deasserted and at least one other nodes wants the virtual slot, the reference node transfers ownership of the virtual slot to the nearest node in the downstream direction that wants the virtual slot.

8. The system of claim 5, wherein the node associated with a particular one of the control circuitry is referred to as the reference node, and wherein if the reference node has a request to send, does not own the virtual slot, and its waiting bit is deasserted, then a bit in the outsig buffer corresponding to the reference node is asserted and the waiting bit is asserted.

9. The system of claim 1, wherein the nodes are connected through conductors and the virtual slots are transmitted on at least some of the conductors.

10. The system of claim 9, wherein the messages travel simultaneously bi-directionally on at least some of the conductors.

11. The system of claim 9, wherein the messages travel bi-directionally on at least some of the conductors, and each node has an insig buffer to receive in signals from a previous node, an outsig buffer to hold out signals for transmission to a next node, a waiting bit, and an ownership history table for each direction.

12. A ring based multiprocessor system, comprising:

nodes in a ring at least some of the nodes including network interface circuitry to transmit messages in multi-flit virtual slots between nodes;

the interface circuitry including control circuitry to determine whether to retain or release ownership of the virtual slots based on values in an insig buffer and an ownership history table.

13. The system of claim 12, wherein the ring is connected by conductors and the virtual slots are transmitted on at least some of the conductors.

14. The system of claim 12, wherein the control circuitry determines whether to retain or release ownership of the virtual slots based on values in the insig buffer, the ownership history table, and a waiting bit.

15. A ring based multiprocessor system, comprising:

nodes connected through conductors in a ring at least some of the nodes including network interface circuitry to transmit messages in beginning at a first flit of multi-flit virtual slots on at least some of the conductors;

the interface circuitry including control circuitry to determine whether to retain or release ownership of a virtual slot based on values in an insig buffer, a waiting bit, and an ownership history table.

16. The system of claim 15, wherein the node associated with a particular one of the control circuitry is referred to as the reference node, and wherein if the reference node has a request to send and it owns the virtual slot, and either its waiting bit is set or no other nodes want the virtual slot, the reference node will send the request in the virtual slot, deassert its waiting bit, and deassert a value in the outsig corresponding to the reference node.

17. The system of claim 15, wherein the node associated with a particular one of the control circuitry is referred to as the reference node, and wherein if the reference node has a request to send and it owns the virtual slot, its waiting bit is deasserted and at least one other nodes wants the virtual slot, the reference node transfers ownership of the virtual slot to the nearest node in the downstream direction that wants the virtual slot.

18. The system of claim 15, wherein the node associated with a particular one of the control circuitry is referred to as the reference node, and wherein if the reference node has a request to send, does not own the virtual slot, and its waiting bit is deasserted, then a bit in the outsig buffer corresponding to the reference node is asserted and the waiting bit is asserted.

19. A node comprising:

network interface circuitry to transmit messages beginning at a first flit of multi-flit virtual slots, wherein the network interface circuitry includes control circuitry including an insig buffer to receive in signals, an outsig buffer to hold out signals for transmission, and an ownership history table.

20. The node of claim 19, wherein a node will only provide a message in a virtual slot if the node owns the virtual slot.

21. The node of claim 19, wherein the control circuitry determines whether to retain or release ownership of a virtual slot based on values in the insig buffer, a waiting bit, and the ownership history table.

22. The node of claim 21, wherein the node associated with a particular one of the control circuitry is referred to as the reference node, and wherein if the reference node has a request to send and it owns the virtual slot, and either its waiting bit is set or no other nodes want the virtual slot, the reference node will send the request in the virtual slot, deassert its waiting bit, and deassert a value in the outsig corresponding to the reference node.

23. A node comprising:

network interface circuitry to transmit messages in multi-flit virtual slots;

the interface circuitry including control circuitry to determine whether to retain or release ownership of the virtual slots based on values in an insig buffer and an ownership history table.

24. The node of claim 23, wherein the control circuitry determines whether to retain or release ownership of the virtual slots based on values in the insig buffer, the ownership history table, and a waiting bit.

* * * * *